(12) United States Patent
Rice

(10) Patent No.: US 9,127,770 B2
(45) Date of Patent: Sep. 8, 2015

(54) TUNED FLUID SEAL

(75) Inventor: Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1527 days.

(21) Appl. No.: 12/002,908

(22) Filed: Dec. 19, 2007

(65) Prior Publication Data

US 2009/0200744 A1 Aug. 13, 2009

Related U.S. Application Data

(60) Provisional application No. 60/875,640, filed on Dec. 19, 2006.

(51) Int. Cl.
*F16J 15/44* (2006.01)
*F16J 15/32* (2006.01)
*F16J 15/447* (2006.01)

(52) U.S. Cl.
CPC .......... *F16J 15/3224* (2013.01); *F16J 15/3288* (2013.01); *F16J 15/444* (2013.01); *F16J 15/447* (2013.01)

(58) Field of Classification Search
USPC .......................................... 277/411–415, 421
See application file for complete search history.

(56) References Cited

U.S. PATENT DOCUMENTS

| | | | |
|---|---|---|---|
| 3,085,809 A * | 4/1963 | Cooper | 277/415 |
| 3,701,536 A * | 10/1972 | Matthews et al. | 277/415 |
| 3,989,410 A * | 11/1976 | Ferrari | 415/115 |
| 4,218,066 A * | 8/1980 | Ackermann | 277/414 |
| 4,402,515 A * | 9/1983 | Malott | 277/415 |
| 5,080,557 A * | 1/1992 | Berger | 415/173.3 |
| 7,025,356 B1 * | 4/2006 | Cheung et al. | 277/415 |

* cited by examiner

*Primary Examiner* — Vishal Patel
(74) *Attorney, Agent, or Firm* — Krieg DeVault LLP

(57) ABSTRACT

A seal system having a rotating seal section and a static seal section operable for working together to restrict fluid flow there between. An arm connected to the static seal is tuned to move the static seal asymmetrically to correspond with asymmetric movement of the rotating seal during operation to maintain a desired relative position between the static and rotating seals.

17 Claims, 5 Drawing Sheets

TUNED FLUID SEAL

CROSS REFERENCE

The present application claims the benefit of U.S. Patent Application No. 60/875,640, filed Dec. 19, 2006, which is incorporated herein by reference.

GOVERNMENT RIGHTS

The present invention was made with U.S. Government support under contract no. N00019-04-C-0093 awarded by the United States Navy. The United States Government will have certain rights herein.

FIELD OF THE INVENTION

The present invention relates generally to a fluid seal, and more particularly in one form to a fluid seal having a static portion tuned to match deflections of a rotating portion as operating conditions change within an apparatus.

BACKGROUND

Fluid seals in high-speed machines such as a gas turbine engines typically have a rotating section and a corresponding static section. Some fluid seals are designed such that the rotating section engages the static section during operation. Other fluid seals are designed to have a predetermined gap or space between the rotating and static sections. One problem associated with fluid seals is that during certain operating conditions the static section and rotating section may be displaced from their nominal positions. Operating parameters that cause movement or deflection in the seal position include rotational speed of the rotating section as well as pressure, temperature, and mass flow rate of the fluid. If the static section and the rotating section each deflect proportionally during operation of the machine then the seal will work as designed. If however, the deflection of the static section does not match the deflection of the rotating section then the seal will be less effective. The present application provides a novel and non-obvious improvement in seal operation as the static section of the seal is tuned to match the movement or deflection of the rotating section of the seal.

SUMMARY

An aspect of the present invention discloses an apparatus having a rotating component with a rotating fluid seal coupled with a static seal for restricting fluid flow therebetween. An arm having first and second ends connected to static structure carries the static seal and is tuned to asymmetrically move in response to a change of operating conditions in the apparatus.

Another aspect of the present invention discloses a seal system comprising a rotatable seal and a static seal operable for working with the rotatable seal to restrict fluid flow therebetween and an arm connected to the static seal. The arm is tuned to move in an asymmetric manner to correspond with asymmetric movement of the rotatable seal as operating conditions of the seal system changes.

In another aspect of the present invention a method provides for controlling the position of a static seal relative to a position of a rotating seal, operating the rotating seal in a machine, asymmetrically moving the rotating seal in a manner in response to operating conditions within the machine and moving the static seal in an asymmetric manner corresponding to the asymmetric movement of the rotating seal.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
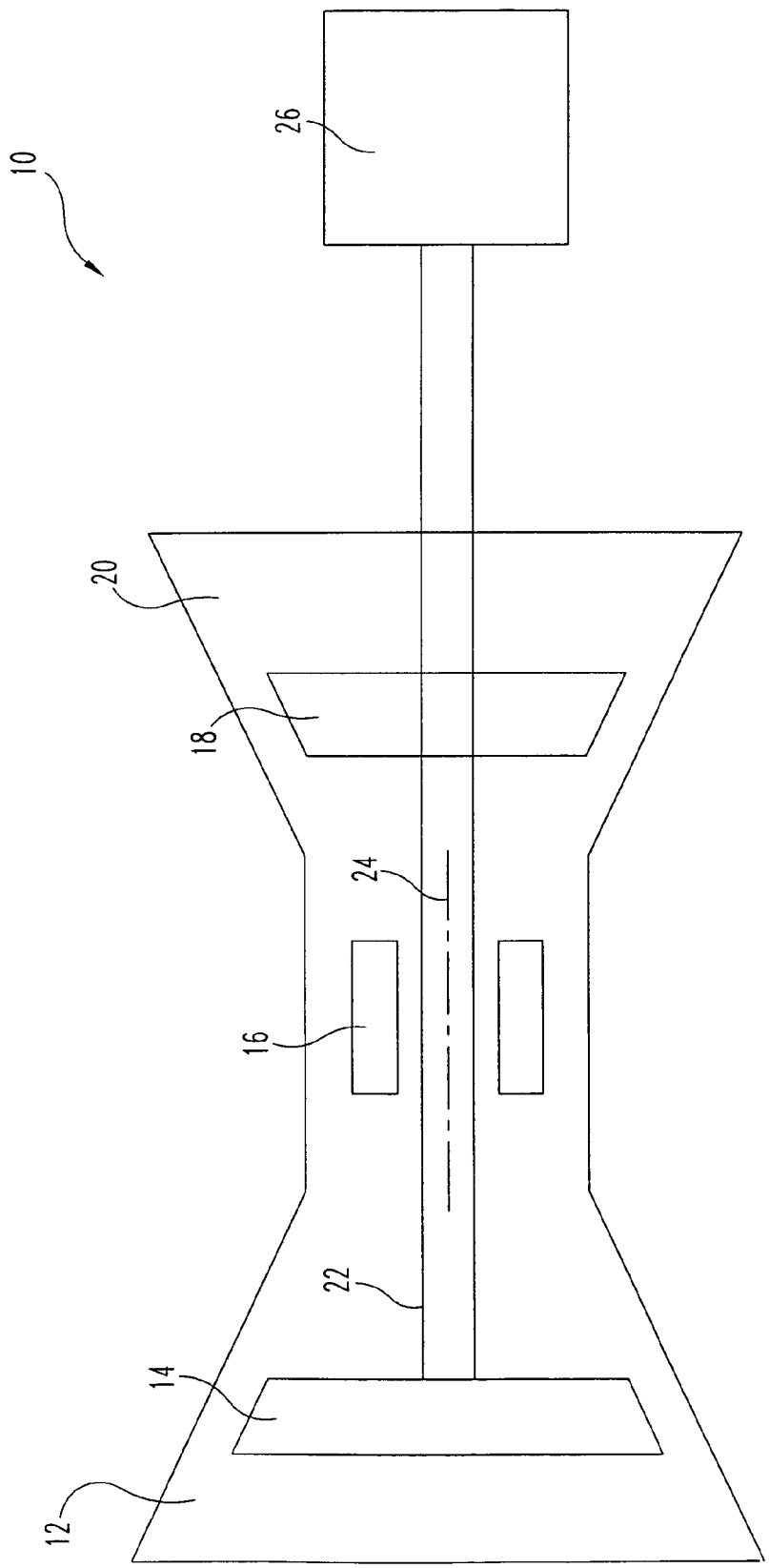
FIG. 1 is a schematic view of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Many fluid seals are designed to restrict fluid flow from moving between rotating and static sections of the seal. It may be desirable to completely eliminate fluid flow, or alternatively, to minimize the flow to a predefined level. Fluid seals in machines such as gas turbine engines work well at design conditions and when the static section of the seal matches the displacement or deflection of the rotating section of the seal during operation of the machine. However, many rotating seals do not always move symmetrically in a radial direction in response to temperature and pressure changes. Sometimes rotating seals move asymmetrically such that one end of the seal moves to a different radial location than the other end. When asymmetrical movement occurs in the rotating section of the seal and the static section of the seal does not move a similar manner, the seal loses its design effectiveness. In order to minimize the gap between the rotating and static sections of the seal without rubbing the static section of the seal, the static section must be designed to move proportionally with respect to the rotating section of the seal.

Referring to FIG. 1, a schematic view of a gas turbine engine 10 is depicted. While the gas turbine engine is illustrated with one spool (i.e. one shaft connecting a turbine and a compressor), it should be understood that the present invention is not limited to any particular engine design or configuration and as such may be used in multi spool engines of the aero or power generation type. The gas turbine engine 10 will be described generally, however significant details regarding general gas turbine engines will not be presented herein as it is believed that the theory of operation and general parameters of gas turbine engines are well known to those of ordinary skill in the art.

The gas turbine engine 10 includes an inlet section 12, a compressor section 14, a combustor section 16, a turbine section 18, and an exhaust section 20. In operation, air is drawn in through the inlet 12 and compressed to a high pressure relative to ambient pressure in the compressor section 14. The air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 22. The shaft 22 rotates about a centerline axis 24 that extends axially along the longitudinal axis of the engine 10, such that as the turbine section 18 rotates due to the forces generated by the high pressure working fluid, the compressor section 14 is rotatingly driven by the turbine section 18 to produce compressed air. A portion of the power extracted from the turbine section 18 can be utilized to drive a secondary device 26, such as an electrical, gas compressor or pump and the like. Alternatively, the gas turbine engine 10 can be of the aero type to produce thrust or shaft power for fixed wing aircraft or rotorcraft, respectively. Thrust producing engines produce high velocity mass flow through the exhaust section 20 and do not drive a secondary device 26.

Figure 2:
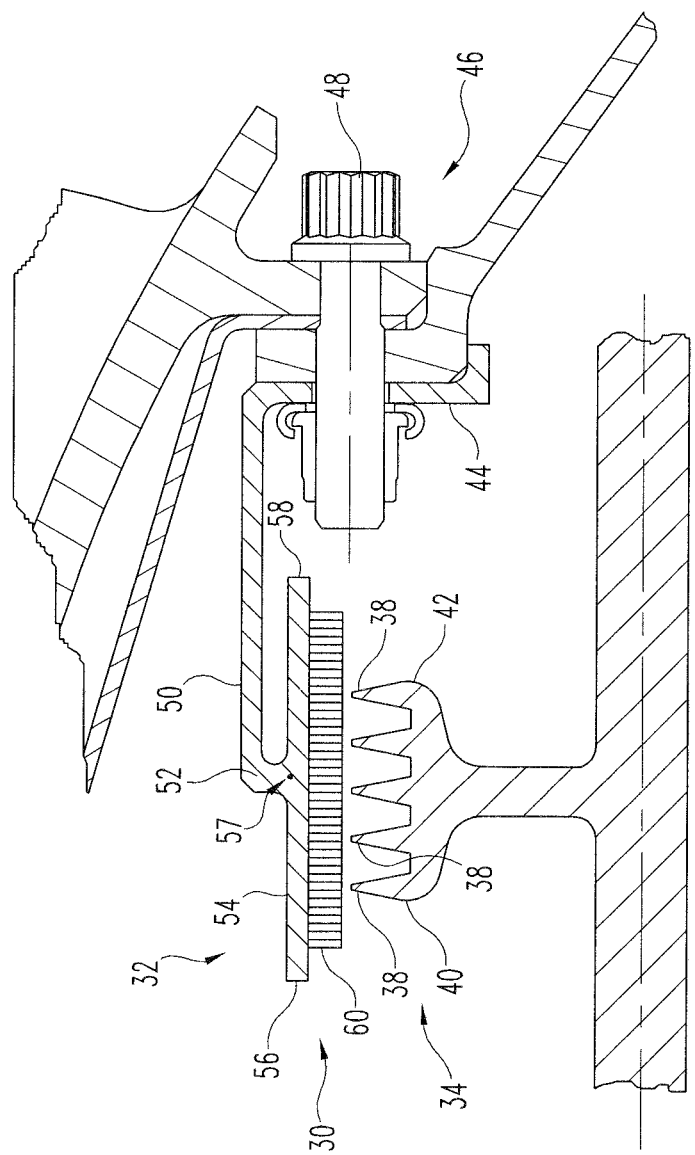
FIG. 2 is section view of a fluid seal within a gas turbine engine.

Referring now to FIG. 2, a fluid seal 30 located internal to the engine 10 is illustrated. The fluid seal 30 includes a static section 32 and a rotating section 34. The rotating section 34 extends from a rotating component such as a shaft 36 and is positioned proximate the static section 32 of the seal 30. The rotating section 34 of the seal 30 can include a plurality of edges 38 sometimes called knives that extend radially outward between a leading edge 40 and a trailing edge 42 of the rotating section 34. The static section 32 of the seal 30 can include a flange 44 to connect with static support structure 46 within the engine 10. A plurality of mechanical fasteners 48 such as threaded bolts or screws and the like can be used to attach the flange 44 to the static structure 46. An outer arm 50 is connected to the flange 44 and extends toward a desired location of the static section 32 of the fluid seal 30. An attachment arm 52 connects an inner arm 54 to the outer arm 50 of the static seal section 32. The inner arm 54 has a leading edge 56 and a trailing edge 58 and is connected to the attachment arm 52 at an attachment point 57 between the leading and trailing edges 56, 58, respectively. The present application contemplates that the length from the leading edge to the attachment point 57 and the length from the trailing edge 58 to the attachment point 57 may be similar or dissimilar. It should be understood that the terms "leading-edge" and "trailing edge" are with reference to fluid flow direction. In general, a fluid streamline will pass by a leading edge prior to passing the trailing edge for any particular component.

A static seal member 60 is attached to the inner arm 54. The static seal member 60 extends radially inward toward the rotating seal section 34. The seal member 60 can be made from materials that can withstand the temperatures, pressures and loads placed on the seal in operation. Typical material selection would include metals such as stainless steel and super alloys as would be known to those killed in the art. The static seal member 60 can be a honeycomb seal, but also could include other types such as brush seals and labyrinth seals. The seal 32 can be formed as a continuous 360° ring or alternatively can be segmented or placed in discreet positions around a centerline of rotation 24 as desired. The static seal 32 is designed to maintain a desired position relative to the rotating seal 34. The relative position between the static and rotating sections 32, 34 respectively, can include no gap (i.e. engagement) to a relatively large gap if metered fluid flow through the seal 30 is desired.

Figure 3:
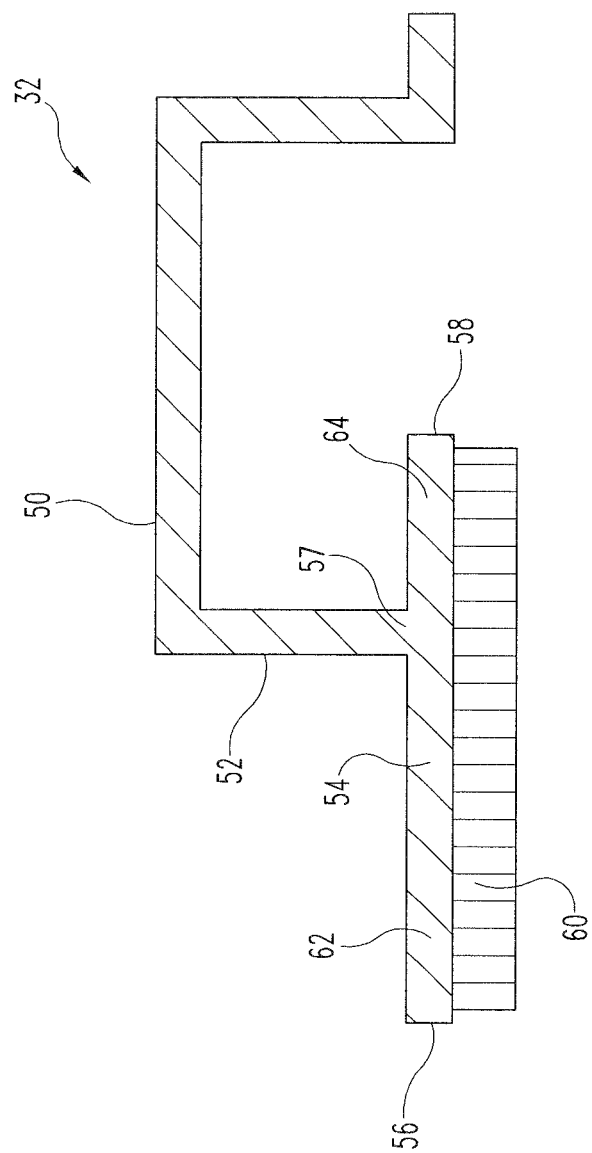
FIG. 3 is a first exemplary embodiment of a static section of a fluid seal according to the present invention.

Referring now to FIG. 3, one embodiment of the present invention shows a static seal 32 operable for moving asymmetrically by offsetting the attachment point 57 of the inner arm 54 to the attachment arm 52 toward the trailing edge 58 of the inner arm 54. If the inner arm 54 pivots about the attachment point 57 during operation caused by movement in the outer arm 50 or attachment arm 52, then the leading edge 56 will be located in a different radial position than the trailing edge 58. The inner arm 54 includes a forward portion 62 and an aft portion 64. For example, if the inner arm 54 pivots counterclockwise about attachment point 57, then the leading edge 56 will be located radially inward relative to the trailing edge 58.

Figure 4:
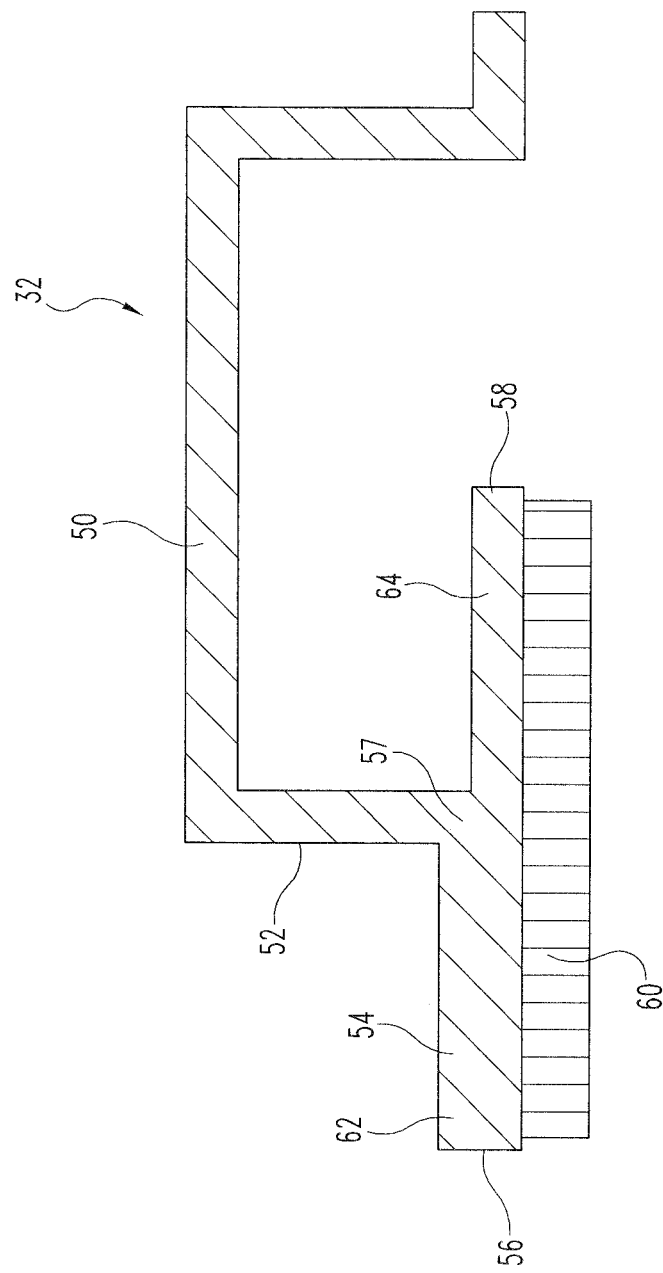
FIG. 4 is a second exemplary embodiment of a static section of a fluid seal according to the present invention.

Referring now to FIG. 4, another embodiment of the present invention shows a static seal 32 operable for moving asymmetrically by forming foreword portion 62 of the inner arm 54 with a different section thickness than aft portion 64. It should be understood that section thickness could be greater in one of the foreword or aft portions 62, 64 than the other of the foreword or aft portions. A thicker section will cause the inner arm 54 to respond slower to temperature variations and will be stiffer to withstand pressure loads relative to a thinner section of the inner arm 54.

Figure 5:
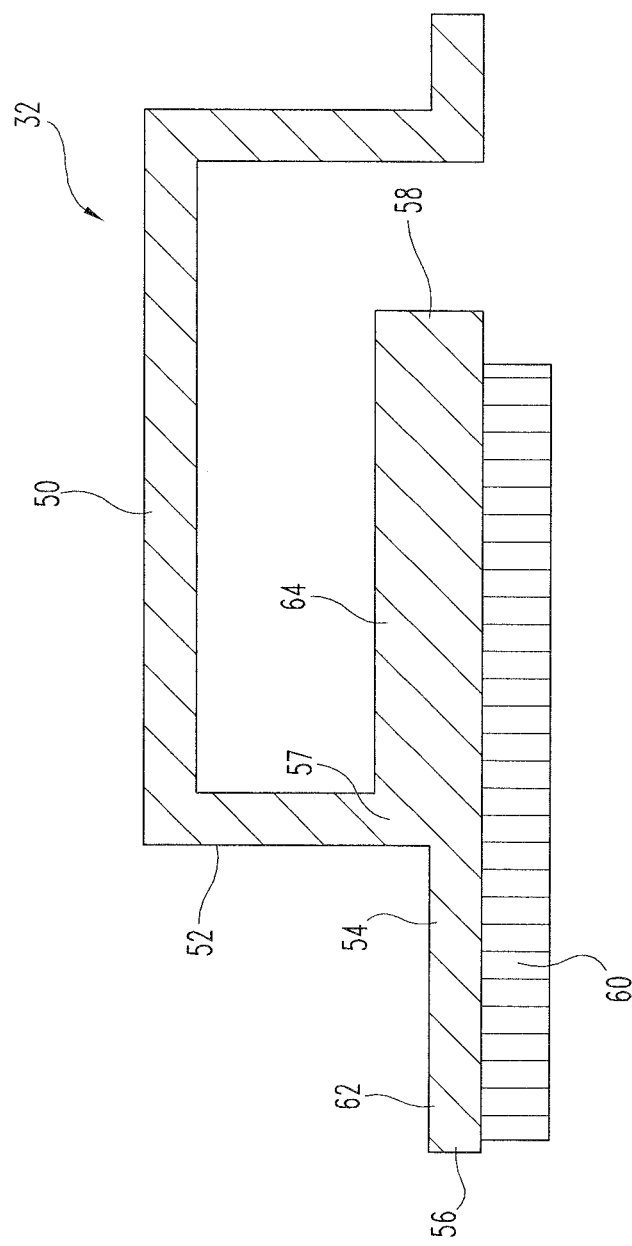
FIG. 5 is a third exemplary embodiment of a static section of a fluid seal according to the present invention.

Referring now to FIG. 5, another embodiment of the present invention shows a static seal 32 operable for moving asymmetrically by forming the offset attachment point 57 with a change of section shape in the aft portion 64 or forward portion 62 of the inner arm 54. It should be understood that the magnitude and direction of the offset and the section thickness can be varied as necessary to match the deflection of the rotating section 34. Further alternate embodiments of the present invention can include asymmetrical construction and attachment of other static structure such as the outer arm 50 and the attachment arm 52.

In operation, the static section 32 of the seal 30 is positioned at a nominal location relative to the rotating section 34 of the seal. The nominal position of the static and rotating seals 32, 34 can include full engagement between the two or alternatively provide a gap therebetween. When the operating temperature of the fluid in the engine 10 increases, the radial position of the knife edges 38 and the static seal member 60 generally will deflect outward in a radial direction. Due to design and operating conditions, the rotating section 34 may deflect asymmetrically in the radial direction. Utilizing the design techniques disclosed by the present invention, the static section 32 of the seal can substantially match the asymmetrical movement of the rotating section 34 thereby minimizing the variation in gap distance between the rotating and static sections 32, 34 of the seal 30.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
a shaft;
a rotating seal extending from and spaced apart radially from the shaft, wherein the rotating seal extends circumferentially around the shaft;
a static seal configured for cooperation with the rotating seal to restrict fluid flow therebetween; and
an arm configured to support the static seal, wherein the arm is tuned to asymmetrically move in response to a change of operating conditions in the apparatus and configured to maintain a desired gap between the static seal and the rotating seal during and after the change of operating conditions.

2. An apparatus comprising:
a rotating component having a rotating seal rotatable about an axis, wherein the rotating seal is spaced apart radially from the rotating component;
a static seal operable for working with the rotating seal to restrict fluid flow therebetween; and
an arm having first and second ends and an attachment point, wherein the arm carries the static seal and is connected to a static structure via the attachment point, and wherein the arm is tuned to asymmetrically move in response to a change of operating conditions in the apparatus and configured to maintain a desired gap between the static seal and the rotating seal after the change of operating conditions,
wherein the attachment point is offset toward either the first or second end.

3. The apparatus of claim 2, wherein one end of the arm has a larger mass than the other end of the arm.

4. The apparatus of claim 2, wherein the arm has variable cross sectional geometry along the length thereof.

5. The apparatus of claim 2, wherein the arm is formed from a plurality of materials.

6. The apparatus of claim 2, wherein the static seal is one of a brush seal, a honeycomb seal, or a labyrinth seal.

7. The apparatus of claim 2, wherein the static seal is one of a contact seal and a proximity seal.

8. The apparatus of claim 2, wherein the operating conditions include fluid pressure, fluid temperature, and rotational speed of the rotating component.

9. A seal system comprising:
a shaft;
a rotatable seal spaced apart radially from the shaft and rotatable with the shaft about an axis;
a static seal operable for working with the rotatable seal to restrict fluid flow therebetween; and
an arm carrying the static seal and connected via an attachment point to a static support, wherein the arm is tuned to asymmetrically move in response to a change in operating conditions and configured to maintain a desired gap between the static seal and the rotating seal after the operating conditions change,
wherein the seal system supports operation of a gas turbine engine.

10. The seal system of claim 9, wherein the arm is connected off center to the attachment point.

11. The seal system of claim 9, wherein one end of the arm has a larger mass than the other end of the arm.

12. The seal system of claim 9, wherein the arm has variable cross sectional geometry along the length thereof.

13. The seal system of claim 9, wherein arm is formed from a plurality of materials.

14. The seal system of claim 9, wherein one end of the arm is configured to maintain the desired gap during operation by moving a different distance in a radial direction than the other end.

15. The seal system of claim 9, wherein one end of the rotatable seal is operative to move to a different radial location than another end of the rotatable seal.

16. The seal system of claim 9, wherein the arm is tuned to keep the static seal a desired distance from the rotatable seal along the entire sealing length.

17. The seal system of claim 9, the arm is configured to maintain the desired gap between the static and rotating seals throughout a range of operating conditions.

* * * * *